Sept. 12, 1933.   S. BERGSTEIN   1,926,364
MACHINE AND METHOD FOR MAKING KNOCKDOWN BOXES
Filed Feb. 19, 1931   5 Sheets-Sheet 2
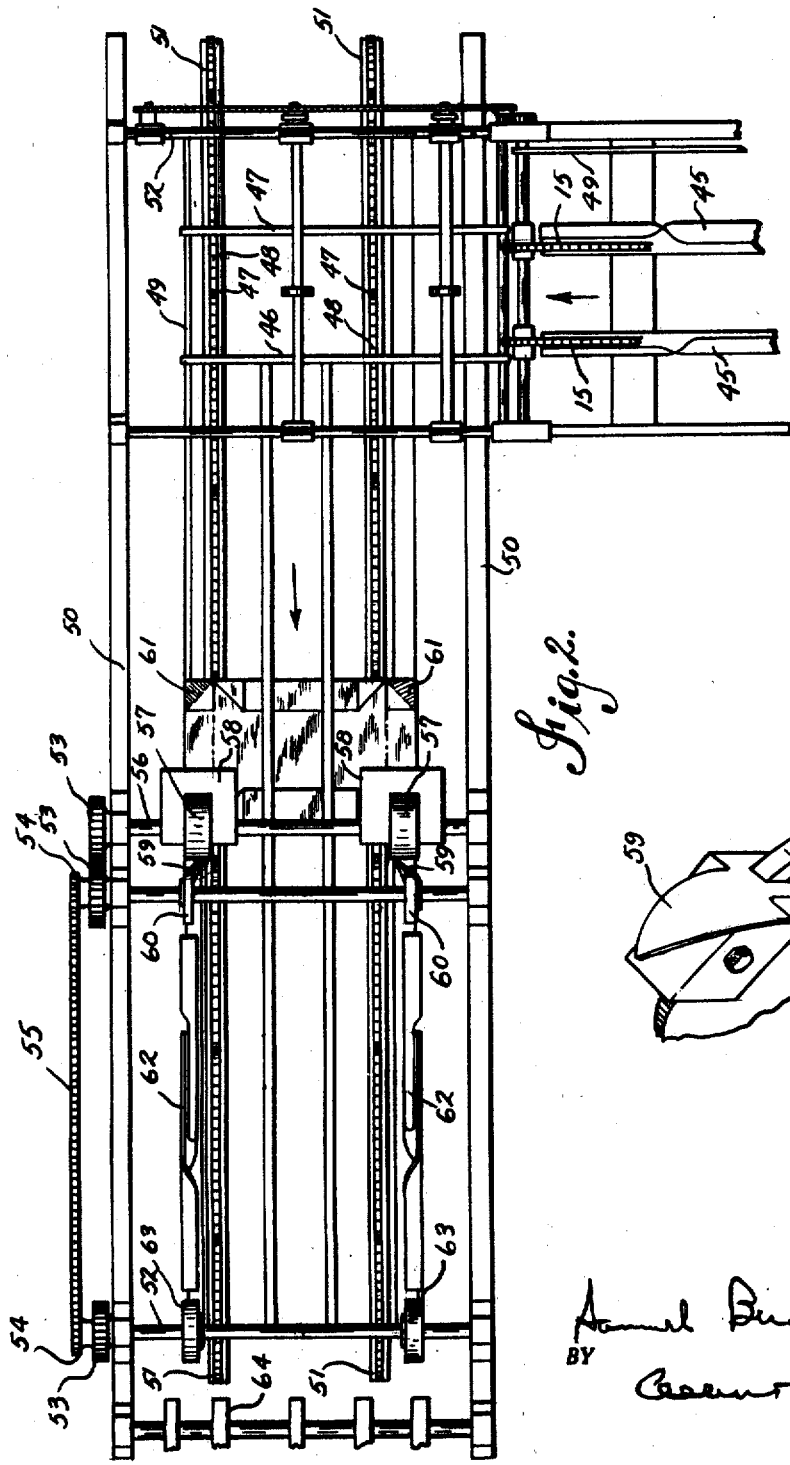
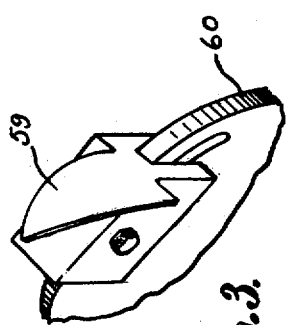
INVENTOR.
Samuel Bergstein
BY
ATTORNEY.

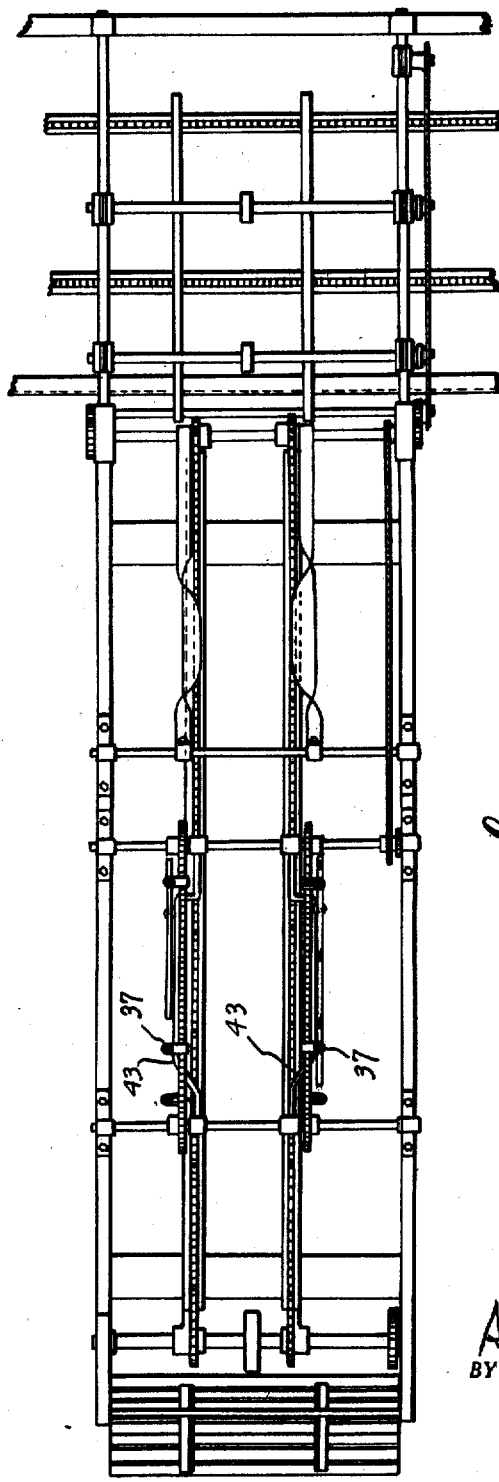

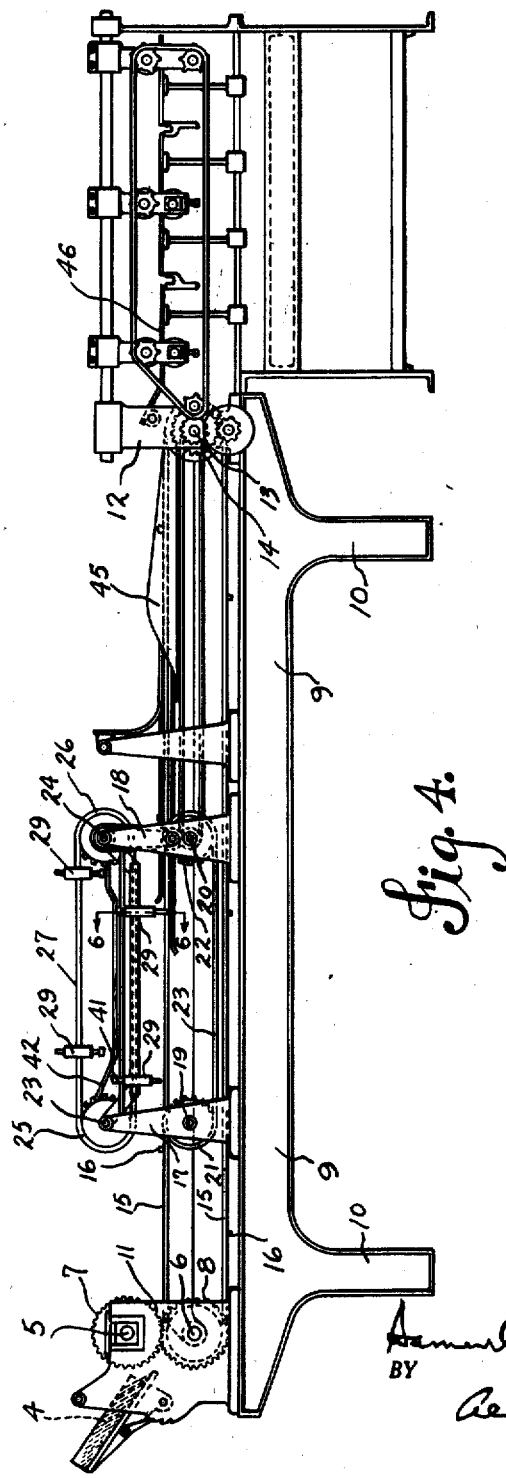

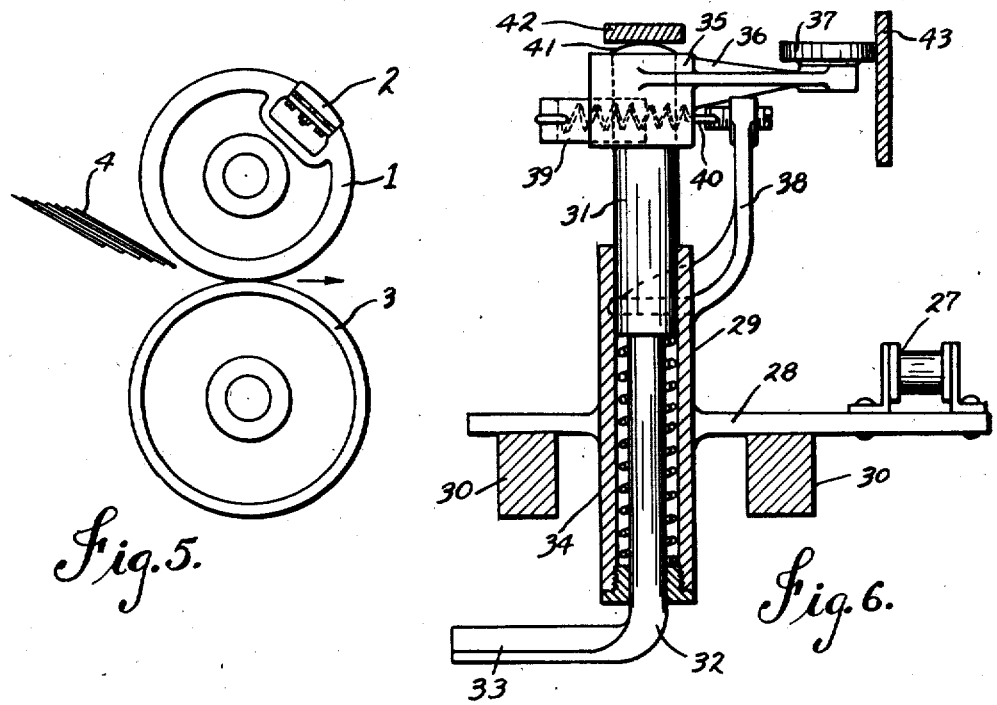
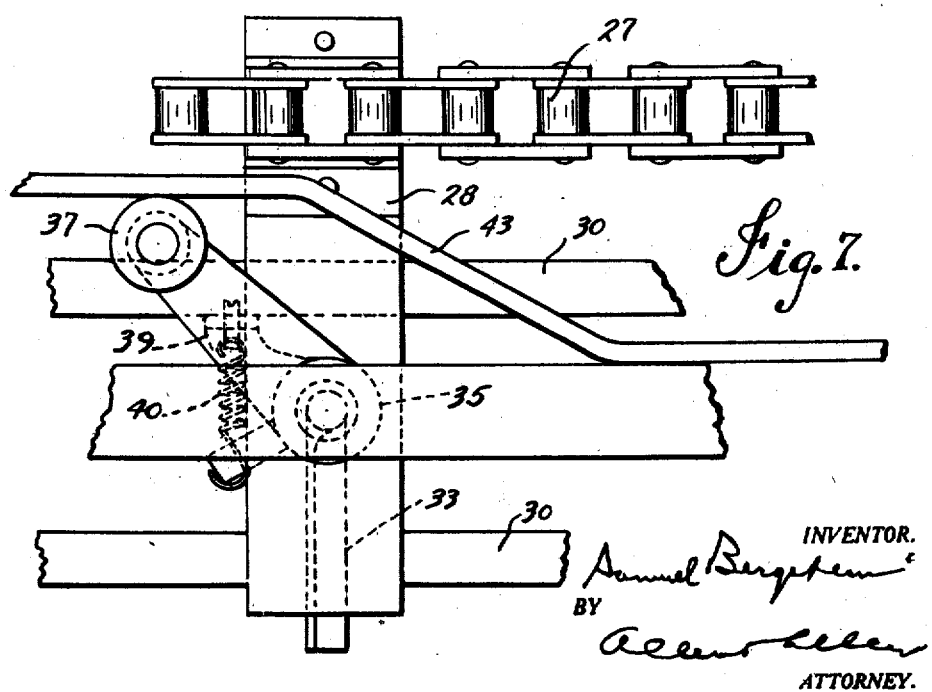

Sept. 12, 1933.  S. BERGSTEIN  1,926,364
MACHINE AND METHOD FOR MAKING KNOCKDOWN BOXES
Filed Feb. 19, 1931   5 Sheets-Sheet 5

INVENTOR.
Samuel Bergstein
BY
ATTORNEY.

Patented Sept. 12, 1933

1,926,364

UNITED STATES PATENT OFFICE 1,926,364

MACHINE AND METHOD FOR MAKING KNOCKDOWN BOXES

Samuel Bergstein, Cincinnati, Ohio

Application February 19, 1931. Serial No. 516,971

20 Claims. (Cl. 93—49)

My invention relates to the type of boxes commonly known in the trade as knock-down or wall boxes, which are furnished in flat and collapsed condition in order to save space in store rooms, and in which, prior to use, the boxes may, by a simple manual manipulation, be opened up so as to receive their contents.

Boxes of the type to which my invention relates have been made in the past, it being an object of my invention to improve structurally on this general type of knock-down boxes, and to provide a method by which the boxes may be made in collapsed condition so that no further operation will be required than to ship them to the user in the collapsed condition in which they are made.

It has been proposed in the prior art to make a box of this type by cutting a series of the boxes from a sheet without waste. Not only is it my object to provide a cut and scored blank in which there is no waste in the sheet from which the blank is cut, but further, that the pattern for the box does not include any triangular or cut away flap clearance to enable the various walls of the box to be more readily assembled.

It is my object to provide a machine which will take cut and scored blanks in sequence from a supply, which will perform a series of folding operations on the blanks while they move continuously through the machine, and which will deliver them in completely assembled, collapsed condition, ready for shipment.

Boxes of the type to which my invention relates have been provided in which triangular tabs are formed at the ends of the meeting side walls, one tab of which is formed by creasing an end of one wall, and the other tab which is formed by extending a triangular member from the adjacent edge of the adjacent side wall. Such a construction provides a box which, when opened up, may have a tendency to have its wall bulge out beyond the vertical or beyond a position at right angles to the bottom wall of the box.

It is an object of my invention to provide a carton in which a reinforcing flap is provided, which resists the outwardly bulging of the side walls beyond a position approximately at right angles to the bottom wall of the container.

Among my specific objects in the method of folding the blank, it is my object to fold certain flaps of side wall portions of the blank downwardly and inwardly while supporting the main body of the wall portions, to which the outwardly and inwardly folded blanks are articulated.

It is also my object to perform the aforenoted downwardly and inwardly folding operation during the continuous movement without pause of the blank through the machine.

Another object of my invention is to completely hold folded portions of the blank by guide bars, so that when once folded the folded portions have no tendency to spring up. Another object of my invention is to avoid an operation known as direct and reverse folding of different areas of the same side wall portions, which, as far as I am advised, has, in the previous manufacture of this type of container, required that the blank remain stationary while this folding is accomplished. The folding of portions of the walls of a blank in one direction, while at the same time folding other articulated portions of the same blank in an opposite direction, is a mechanically difficult operation to perform, and the stopping of the blank materially retards such speed as is required for practical commercial production, so that one of the features of my invention is that during the folding of the blank all the direct folding action is accomplished with the blank in motion.

The above objects and other objects to which reference will be made in the ensuing description, I accomplish by that certain combination and arrangement of parts and by following out the steps in the method which will be hereinafter described.

Referring to the drawings:—

Figure 1 is a plan view of the mechanism required to accomplish the initial folding.

Figure 2 is a plan view of the mechanism required for the completion of the folding, gluing and assembly of the box in collapsed condition.

Figure 3 is a perspective view showing one arrangement for a glue applying pad.

Figure 4 is a side elevation of the initial folding operation illustrated in Figure 1.

Figure 5 is a diagrammatic side elevation of the blank pick-up rolls.

Figure 6 is a detail sectional view taken along the lines 6—6 in Figure 4.

Figure 7 is a plan view of the flap folding mechanism illustrated in Figure 6.

Referring first to Figures 8 to 13, I will first describe the carton blank and illustrate the manner in which the walls are folded and scored to form the collapsed container. The blank has a main body $a$, opposed side wall portions $b$ and $c$, articulated to opposed edges of the body $a$, and opposed end wall portions $d$ and $e$, articulated to the other opposed side edges of the body $a$. For purposes of clearness I will refer to the wall portions $b$ and $c$ as side wall portions, and to the portions $d$ and $e$ as end wall portions. The above terminology further refers to the manner in which the blanks pass through the machine, although it must be understood that the relative length and width of the carton may be varied in accordance with the type of container which it is desired to produce.

Beginning at the outer corners of the lines of articulation of the side wall portions, there are score lines extending transversely across the flaps $b$ and $c$, providing triangular flap portions $f$. For purposes of clearness I will refer to the flaps $f$ as the glue flaps, as it is these flaps which are fastened to other flaps to form a continuous articulated wall of the side and end walls.

Extending from the ends of the end wall portions, I have shown rectangular flaps $g$ which, since the purpose of forming these pieces rectangular is to reinforce the box against a tendency to bulge outwardly when it is opened, I shall refer to as reinforcing flaps.

In the type of blank which I have illustrated, the glue flaps in the finished collapsed box are secured to a triangular portion of the adjacent reinforcing flaps, and it will be understood the adhesive may either be applied to a triangular portion of the reinforcing flaps so as to register with the glue flaps, or the adhesive may be applied to the glue flaps themselves.

Figure 8:
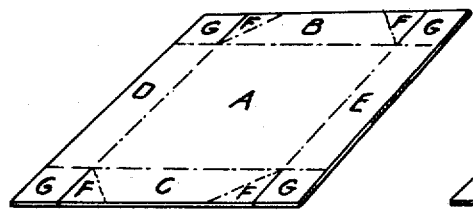
Figure 8 is a perspective view of the cut and scored blank.
Figure 9:
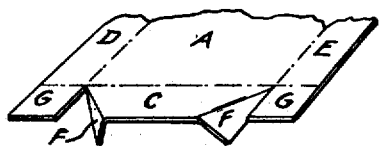
Figure 9 is a perspective view of the initial folding down operation of the triangular end edges of a pair of the opposed walls of the container.

In order to consider the successive folding operations of the blank, let us assume that we are observing the folding action of the blanks from a position at the right side of the machine, as indicated in Figure 4, and that the blanks move from left to right. Figure 8 illustrates the blank as it starts into the machine. Figure 9 illustrates the first folding operation which, it will be noted, is a folding down of the glue flaps along their diagonal line of articulation to the side walls. After the glue flaps are folded down to a right angle position with relation to the side walls, and while the side walls are being supported from being bent down with the glue flaps, another operation folds the glue flaps inwardly so that they lie against the bottom surface of the side wall portions.

Figure 11:
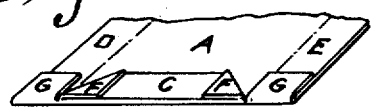
Figure 11 is a perspective view of a part of the blank after the completion of the second folding operation.

While held in this downwardly inversely folded position, the side wall portions and the reinforcing flaps are folded over to the position shown in Figure 11. It will be noted that this folding operation is a direct one, such as can be accomplished by a simple turn-over plate or guide.

After the blank has been folded into the position shown in Figure 11, it is then moved at right angles to its previous direction of movement, adhesive is applied, and then the end wall flaps, together with the reinforcing flaps, are folded along the line of articulation of the end wall flaps with the body or bottom of the blank. Here, again, it will be obvious that this latter folding operation, which brings the side and end walls to the position shown in Figure 12, can be accomplished by a simple turn-over folding operation.

Figure 13:
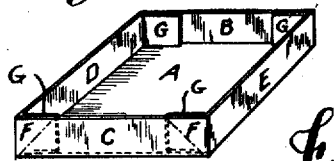
Figure 13 is a perspective view of the particular type of container illustrated after it is set up.

If reference will be had to Figure 13, it will be observed that when the box is opened out, the rectangular reinforcing flaps resist bulging of the box outwardly along the lines of articulation of the triangular sealing flaps. Further, when the reinforcing flaps are in the position indicated, there is great resistance against the walls collapsing inwardly because the bottom edges of the reinforcing flaps fit snugly against the bottom of the container.

It will further be obvious that the blanks can be cut from desired widths of box board not only with no wastage, but without there being cut away portions for the flaps which form the box to facilitate the folding operations.

Having described the folding steps in the assembling of my collapsed box, I will now describe suitable mechanism for accomplishing this folding automatically and continuously.

Figure 5 illustrates diagrammatically the draw-in rolls, which may be formed by a metallic roller 1, having a rubber pad 2 extending peripherally from it and with a rubber faced roll 3, which is in peripheral engagement with the roller 1. A supply of blanks is indicated at 4, and it will be observed that each time the pad 2 comes around it will pick up a blank, causing it to be advanced between the rolls 1 and 3, in the direction of the arrow. The rolls 1 and 3 are mounted on shafts 5 and 6 respectively, which may be driven by meshing gears 7 and 8.

The machine has a frame 9 having supporting legs 10.

The initial folding and feeding mechanism consists of three series of continuous spaced chains moving in timed relation to the feed of the intake roll 1.

Upright castings 11 and 12 house the journals for the shafts 6 and 13, on which are mounted the sprockets 8 and 14. Spaced continuous conveyors 15 are formed preferably from connected links of a chain, and these chains carry pushing lugs 16, the movement of which is so timed with relation to the feeding in of the successive blanks that shortly after the blank is fed in a lug 16 moves around and engages the rear end of the blank, causing it to move forward to the folding mechanism.

Mounted on upright brackets 17, 18, are the journals for the shafts 19, 20, which carry sprockets 21, 22, respectively, over which chains 23 pass. If reference will be made to Figures 14 and 15, it will be observed that the chains 23 carry supporting plates 24, which support the side wall members during the folding down movement of the glue flaps.

Also mounted in the upright members 18 are the journals for the shafts 23', 24', on which are mounted sprockets 25, 26, respectively. Spaced conveyors 27, composed of chain links, have brackets 28 secured to them, which brackets carry tubular members 29. The tubular members carry the mechanism for folding the glue flaps downwardly and inversely.

In order to prevent downward sagging of the chain, I have provided guide rails 30 along which the brackets 28 slide. Within the tubular members 29 there are rods 31, having downwardly extending bars 32, with folding fingers 33 extending out from them. Springs 34 surrounding the bars 32, force the rods 31 normally upward. The rods 31 have bosses 35, from which extend arms 36, carrying preferably rollers 37. A bracket 38 extends up from the tubular casing 29. The boss 35 has a lug 39 extending from it, and a spring 40 extending between the bracket 38 and the lug 39 tends to bring the fold finger 33 back to normal position, excepting when the roller 37 engages an abutment which causes the folding arm 39 to move arcuately about ninety degrees and fold in the glue flaps of the blank as it moves along on the conveyor.

The downward and inwardly folding mechanism for the glue flaps comprises spaced units carried around on the chains 27. It will be obvious that the spacing of the folding units is in accordance with the width apart of the glue flaps on the particular blank being folded.

The operation of the inwardly and downwardly folding of the glue flaps is accomplished in the two stages illustrated in Figure 9. As a folding unit comes around on the chain, the upper end 41 of the member 31 bears against an inclined track 42, which causes the plunger 31, the arm 32, and the folding finger 33 to engage the glue flaps and push them down to a position extending at right angles to the side wall portions of the blank. In this position the portion of the side wall portions intermediate the glue flaps is supported by means of the plates 24 carried on the chains 23. A short interval after the downward folding of the glue flaps, the rollers 37 engage outwardly flaring tracks 43, which causes the rollers to be relatively retarded, thereby swinging the rod 31, with its extension 32, and the folding arms 33, through an arc, which causes the glue flaps to be inversely folded against the under surface of the side walls of the blank.

Figure 14:
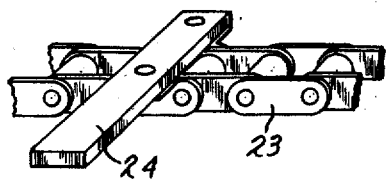
Figure 14 is a detail perspective view of the chain carrying the side wall support plates.
Figure 15:
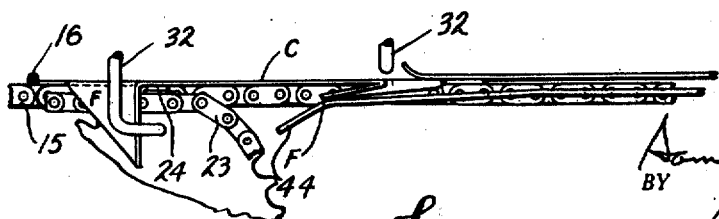
Figure 15 is a detail side elevation showing the arrangement of the mechanism for folding the triangular flaps at the end of opposed side walls downwardly and inwardly.

If reference will be had to Figure 14, it will be noted that it is not necessary for the rods 32 all to have fold fingers on them, because the front glue flap may be inversely folded by means of a turn-over plate 44. The plate 44 also holds the folded rear sealing flaps as soon as the finger 32 moves out of the way. In some instances, however, it may be desired to have a fold finger on the forward inverse folder so as to fold the forward glue flap backwardly in a manner opposed to the manner which I have described.

It will further be obvious that both sides of the blank are folded by mechanism constructed on a right and left hand principle, the folding operations of the opposite sides being inverse one to the other.

Figure 10:
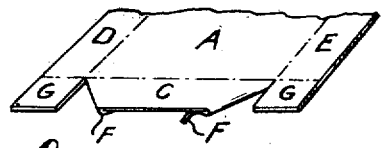
Figure 10 illustrates the completion of the folding operation, the initial start of which is illustrated in Figure 9.

The container in the position indicated in Figure 10 is carried along on the conveyor until it encounters turn-over plates 45, which fold over the side walls and reinforcing flaps, to the position shown in Figure 11, in which position the folded blank is delivered to a cross-feed folding device, generally indicated in end elevation in Figure 4, and in plan view in Figure 2. Feed belts 46 carry the folded container into the cross-feed mechanism, where the folded blank is picked up by spaced lugs 47 on conveyor chains 48. Guide strips 49 keep the folded blank in folded condition during its conveying movement.

The cross-feed folding mechanism is supported on frame members 50, and since the simple operation of gluing and folding a scored blank, except in combination with the previous folding operations which have hereinbefore been described, is old, I will only describe the mechanism to complete the final folding and gluing of the blank in a general manner. The chains 48 pass over sprockets 51, which are fixed on shafts 52, driven by suitable gears 53, with sprockets 54, connected by a chain 55. A shaft 56 carries glue wheels 57, which rotate in glue pots 58, and the glue wheels 57 engage triangular segmental pads 59, preferably adjustably mounted on discs 60.

In the particular modification shown, as the carton blank in the condition illustrated in Figure 11, moves along on the conveyor, a triangular daub of cement is supplied across the reinforcing flaps, as indicated at 61.

Instead of utilizing the arrangement illustrated, it will ordinarily be more practical to apply adhesive to the upper surface of the glue flap, because since the blank is moving widthwise as opposed to its previous lengthwise movement, a glue wheel can be so spaced relative to the blank that it will only apply adhesive to the upper surface of the glue flap, and will not apply adhesive to the upper surface of the main part of the wall of the blank.

Figure 12:
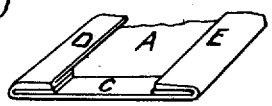
Figure 12 is a perspective view of a portion of the completely assembled container.

After the application of glue, the container is moved to further turned over plates 62 and, as explained, the folding over of the end walls, now the side walls, from the position shown in Figure 11 to the position shown in Figure 12, can be readily accomplished by a simple turn-over plate folding operation.

The container in the folded condition illustrated in Figure 12 then passes underneath the pressure rollers 63, which firmly press down the adhesively secured glue flaps and reinforcing flaps.

Further drying of the folded sides of the box may be provided with pressure belts 64, into which the blanks are fed in sequence as they emerge from beneath the pressure rollers 63.

Since the method of folding the container was first described, it is thought that the accomplishment of the method with the mechanism illustrated will be clearly understood, it being within the scope of my invention to provide other mechanism as long as it accomplishes making of the container in collapsed condition by pursuing the sequence of steps which have been described.

Having thus described my invention, what I claim as new and desire to secure by Letters Patent, is:—

1. The method of making wall boxes in collapsed condition adapted to be set up for use, which consists in cutting and scoring a sheet to provide a blank having a body portion and articulated side wall portions, one pair of the opposed wall members being of the same length as the edges of the body to which they are articulated, and the other opposed wall members being of greater length than the length of the body, said first noted wall members having triangular flaps articulated to their ends, and the other opposed wall members having reinforcing flaps articulated to their ends, which consists in moving the blank along, supporting the first noted side walls portions and folding their end portions down and under diagonally, forming triangular flaps, holding the folded flaps, folding in the other side walls and reinforcing flaps with the triangular portions retained in folded position against the body of the blank, applying adhesive to portions of the side walls, then folding over the opposed walls together with their reinforcing flaps to form the complete assembly of the box in collapsed condition.

2. The method of making wall boxes in collapsed condition adapted to be set up for use, which consists in preparing a blank with side wall portions and end wall portions, the side wall portions having triangular fold flaps at their ends, and the end wall portions having rectangular flaps, folding down the end portions of the side walls diagonally, forming the triangular flaps of the side walls, then folding inwardly the side walls and the reinforcing flaps, while carrying the blank with the side walls parallel with the carrying direction, applying adhesive to secure the triangular flaps to the reinforcing flaps, and then folding the end walls and the reinforcing flaps in upon the body of the blank.

3. The method of making wall boxes in collapsed condition adapted to be set up for use, which consists in providing, without waste, a blank with a body and side and end walls, folding down triangular portions at the outer edges of the side walls so that said portions lie against the under surface of said side walls, and then completing the folding of the collapsed blank by two simple upward folding operations on the side and end walls, respectively at right angles one to the other, the folding of the several members being done while carrying the blank parallel with the lengths of the respective folded members.

4. The method of making wall boxes of the character specified in collapsed condition adapted to be set up for use, which consists in providing a blank with side and end walls one of which has an attaching extension, and folding said side and end walls in one direction and said extension in the opposite direction while said blank is in continuous movement.

5. The method of making wall boxes in collapsed condition adapted to be set up for use, which consists in providing a blank with side and end walls, and during the movement of said blank folding said side and end walls in three folding operations, the first one of which consists in folding downwardly triangular corner portions of said side walls, the folding of the several members being done while carrying the blank parallel with the lengths of the respective folded members.

6. The method of making wall boxes in collapsed condition adapted to be set up for use, which consists in providing a blank with side walls and with end walls having extensions, and durng the movement of said blank folding said side and end walls in three folding operations, the first one of which consists in folding outward triangular corner portions of said side walls, and the next one of which consists in folding inwardly said side walls, together with said extensions of said end walls, the folding of the several members being done while carrying the blank parallel with the lengths of the respective folded members.

7. The method of making wall boxes in collapsed condition adapted to be set up for use, which consists in providing a blank with side walls and with end walls having extensions, and folding said side and end walls in three series of simple folding operations, the first one of which consists in folding downwardly and inwardly triangular corner portions of said side walls, and which next consists in folding upwardly and inwardly said side walls, together with extensions of said end walls, and which finally consists in folding upwardly and inwardly said end walls, the folding of the several members being done while carrying the blank parallel with the lengths of the respective folded members.

8. The method of making boxes from blanks which are cut and scored to provide a bottom section and front and rear wall sections, the bottom section having foldable marginal portions, and the front and rear wall sections having foldable flaps, said method consisting in first folding said marginal portions in one direction while said blank is being moved, and then folding the blank on the lines in the opposite direction between the bottom section and the front and rear wall sections.

9. The method for making wall boxes in collapsed condition adapted to be set up for use, consisting during the movement of blanks of sheets of material with foldable marginal portions projecting from two opposite edges, in folding said marginal portions in one direction against the midwidth of the blanks, folding the blanks on transverse lines in the opposite direction to superpose some of the folded marginal portions at each side of the blanks on their folded marginal portions at the same side of the blanks and securing the contacting marginal portions together.

10. The method of assembling the walls of a knock-down box of the character specified, which consists in moving a blank along, and during its movement, folding triangular portions of side walls of said blank in one direction, supporting the side walls during the folding of the triangular portions, and then proceeding with a complete folding operation of the sides of the blank in the opposite direction, followed by an infolding of the ends of the blank in said opposite direction.

11. In a machine of the character described, side wall folding mechanism comprising means movable downwardly and inwardly to operate on marginal portions of a blank, means for folding in side wall portions of a blank, and means for subsequently folding in end wall portions of the blank.

12. In a machine of the character described, side wall folding mechanism comprising means movable downwardly and inwardly to operate on marginal portions of a blank, means for folding in side wall portions of a blank, and means for subsequently folding in end wall portions of the blank, and adhesive applying means intermediate said latter two folding mechanisms.

13. In a machine of the character described, in combination with blank carrying mechanism, means moving in timed relation with said mechanism for supporting predetermined areas of opposed marginal portions of opposed side walls of a blank, and means also moving in timed relation to said blank carrying mechanism for folding downwardly and inwardly unsupported corner parts of the blank during its movement.

14. In a machine of the character described, in combination with blank carrying mechanism, means moving in timed relation with said mechanism for supporting predetermined areas of opposed marginal portions of opposed side walls of a blank, and means also moving in timed relation to said blank carrying mechanism for folding downwardly and inwardly unsupported corner parts of the blank during its movement, and turn over mechanism arranged within the path of said blank carrying mechanism for folding over said side walls of the blank.

15. In a machine of the character described, in combination with blank carrying mechanism, in combination with mechanism carrying the means for folding triangular corner parts of the sides of a blank downwardly and inwardly during the movement of said blank on said carrying mechanism with said sides carried parallel with the carrying direction.

16. In a machine of the character described, blank, means for folding triangular corner parts of the sides of the blank downwardly and inwardly with said sides carried parallel with the carrying direction, and means for supporting the main bodies of the blanks during the downward and inward folding of the triangular parts.

17. In a machine of the character described, in combination with blank carrying mechanism, means for folding triangular corner parts of the sides of a blank downwardly and inwardly, and means for supporting the main bodies of the blanks during the downward and inward folding of the triangular edges of the sides, said downward and inwardly folding mechanism and said supporting mechanism being carried on endless conveyors moving in timed relation.

18. In a machine of the character described, side wall folding mechanism comprising means movable downwardly and inwardly to operate on marginal portions of the blank as the blank moves with said marginal portions lengthwise of the direction of motion, means for folding in side wall portions of the blank, and means for subsequently folding in end wall portions of the blank while the blank is moving with said end wall portions lengthwise of the direction of motion.

19. The method of assembling the walls of a knock-down box in which opposite wall portions are formed intermediate of extensions of other opposite wall portions by slits in opposite edges of the blank, which consists in moving the blank along, and during the movement, folding triangular corner parts of said intermediate wall portions in one direction, supporting said intermediate wall portions during the folding of said triangular parts, and then proceeding with a complete folding of said intermediate walls and said extensions in the opposite direction, followed by an infolding of said other walls and their folded extensions in said opposite direction.

20. The method of making boxes with walls collapsed for instant erection for remaining erect by means of reinforcing corner glue flaps fastened behind diagonal creases, consisting in taking blanks cut and creased with two opposite edges having each two slits separating corner reinforcing glue flaps from intermediate wall portions, the other two opposite sides of the blank having no slits and the end parts of the intermediate wall portions being diagonally creased, and moving said blanks successively with their slitted edges crosswise of their direction of movement, folding on diagonal lines triangular end portions of the intermediate wall portions, then folding inwardly the reinforcing corner glue flaps and intermediate wall portions, retaining the triangular portions folded, the aforesaid successive foldings being done while the blank is traveling in one continuous direction, then moving the thus folded blank parallel with the other opposite walls of the blank and, after applying adhesive to predetermined portions of the blank, folding the other two side walls on a straight line parallel with the latter movement, all of the aforesaid folding being done while the blank is in motion.

SAMUEL BERGSTEIN.

CERTIFICATE OF CORRECTION.

Patent No. 1,926,364. September 12, 1933.

SAMUEL BERGSTEIN.

It is hereby certified that error appears in the printed specification of the above numbered patent requiring correction as follows: Page 5, first column, line 13, claim 15, strike out the words "in combination with mechanism carrying the" and insert the same after "described," in line 19, claim 16; and that the said Letters Patent should be read with this correction therein that the same may conform to the record of the case in the Patent Office.

Signed and sealed this 14th day of March, A. D. 1939.

Henry Van Arsdale.

(Seal) Acting Commissioner of Patents.

means moving in timed relation with said mechanism for supporting predetermined areas of opposed marginal portions of opposed side walls of a blank, and means also moving in timed relation to said blank carrying mechanism for folding downwardly and inwardly unsupported corner parts of the blank during its movement, and turn over mechanism arranged within the path of said blank carrying mechanism for folding over said side walls of the blank.

15. In a machine of the character described, in combination with blank carrying mechanism, in combination with mechanism carrying the means for folding triangular corner parts of the sides of a blank downwardly and inwardly during the movement of said blank on said carrying mechanism with said sides carried parallel with the carrying direction.

16. In a machine of the character described, blank, means for folding triangular corner parts of the sides of the blank downwardly and inwardly with said sides carried parallel with the carrying direction, and means for supporting the main bodies of the blanks during the downward and inward folding of the triangular parts.

17. In a machine of the character described, in combination with blank carrying mechanism, means for folding triangular corner parts of the sides of a blank downwardly and inwardly, and means for supporting the main bodies of the blanks during the downward and inward folding of the triangular edges of the sides, said downward and inwardly folding mechanism and said supporting mechanism being carried on endless conveyors moving in timed relation.

18. In a machine of the character described, side wall folding mechanism comprising means movable downwardly and inwardly to operate on marginal portions of the blank as the blank moves with said marginal portions lengthwise of the direction of motion, means for folding in side wall portions of the blank, and means for subsequently folding in end wall portions of the blank while the blank is moving with said end wall portions lengthwise of the direction of motion.

19. The method of assembling the walls of a knock-down box in which opposite wall portions are formed intermediate of extensions of other opposite wall portions by slits in opposite edges of the blank, which consists in moving the blank along, and during the movement, folding triangular corner parts of said intermediate wall portions in one direction, supporting said intermediate wall portions during the folding of said triangular parts, and then proceeding with a complete folding of said intermediate walls and said extensions in the opposite direction, followed by an infolding of said other walls and their folded extensions in said opposite direction.

20. The method of making boxes with walls collapsed for instant erection for remaining erect by means of reinforcing corner glue flaps fastened behind diagonal creases, consisting in taking blanks cut and creased with two opposite edges having each two slits separating corner reinforcing glue flaps from intermediate wall portions, the other two opposite sides of the blank having no slits and the end parts of the intermediate wall portions being diagonally creased, and moving said blanks successively with their slitted edges crosswise of their direction of movement, folding on diagonal lines triangular end portions of the intermediate wall portions, then folding inwardly the reinforcing corner glue flaps and intermediate wall portions, retaining the triangular portions folded, the aforesaid successive foldings being done while the blank is traveling in one continuous direction, then moving the thus folded blank parallel with the other opposite walls of the blank and, after applying adhesive to predetermined portions of the blank, folding the other two side walls on a straight line parallel with the latter movement, all of the aforesaid folding being done while the blank is in motion.

SAMUEL BERGSTEIN.

CERTIFICATE OF CORRECTION.

Patent No. 1,926,364.    September 12, 1933.

SAMUEL BERGSTEIN.

It is hereby certified that error appears in the printed specification of the above numbered patent requiring correction as follows: Page 5, first column, line 13, claim 15, strike out the words "in combination with mechanism carrying the" and insert the same after "described," in line 19, claim 16; and that the said Letters Patent should be read with this correction therein that the same may conform to the record of the case in the Patent Office.

Signed and sealed this 14th day of March, A. D. 1939.

Henry Van Arsdale.

(Seal)    Acting Commissioner of Patents.

CERTIFICATE OF CORRECTION.

Patent No. 1,926,364.   September 12, 1933.

SAMUEL BERGSTEIN.

It is hereby certified that error appears in the printed specification of the above numbered patent requiring correction as follows: Page 5, first column, line 13, claim 15, strike out the words "in combination with mechanism carrying the" and insert the same after "described," in line 19, claim 16; and that the said Letters Patent should be read with this correction therein that the same may conform to the record of the case in the Patent Office.

Signed and sealed this 14th day of March, A. D. 1939.

Henry Van Arsdale.

(Seal)   Acting Commissioner of Patents.